US008347981B2

(12) United States Patent
Aoki

(10) Patent No.: US 8,347,981 B2
(45) Date of Patent: Jan. 8, 2013

(54) POWER TOOL

(75) Inventor: Yonosuke Aoki, Anjo (JP)

(73) Assignee: Makita Corporation, Anjo-Shi (JP)

( * ) Notice: Subject to any disclaimer, the term of this patent is extended or adjusted under 35 U.S.C. 154(b) by 359 days.

(21) Appl. No.: 12/458,062

(22) Filed: Jun. 30, 2009

(65) Prior Publication Data

US 2010/0000751 A1 Jan. 7, 2010

(30) Foreign Application Priority Data

Jul. 7, 2008 (JP) ................................ 2008-177156

(51) Int. Cl.

| | |
|---|---|
| ***B23B 45/16*** | (2006.01) |
| ***B25D 9/00*** | (2006.01) |
| ***B25D 11/00*** | (2006.01) |
| ***B25D 13/00*** | (2006.01) |
| ***B25D 16/00*** | (2006.01) |
| ***B25D 17/11*** | (2006.01) |
| ***B25D 17/24*** | (2006.01) |
| ***B25D 17/00*** | (2006.01) |

(52) U.S. Cl. .................................... 173/211; 173/162.1

(58) Field of Classification Search ............ 173/90–115, 173/210–212, 162.1; 267/136–141.7

See application file for complete search history.

(56) References Cited

U.S. PATENT DOCUMENTS

| | | | | |
|---|---|---|---|---|
| 2,875,731 | A | 3/1959 | Settles et al. | |
| 3,845,827 | A * | 11/1974 | Schulin | 173/162.1 |
| 4,776,406 | A * | 10/1988 | Wanner | 173/18 |
| 7,252,157 | B2 * | 8/2007 | Aoki | 173/162.2 |
| 7,383,895 | B2 * | 6/2008 | Aoki | 173/201 |
| 7,604,071 | B2 * | 10/2009 | Ikuta | 173/162.1 |
| 7,806,201 | B2 * | 10/2010 | Aoki | 173/210 |
| 7,828,072 | B2 * | 11/2010 | Hashimoto et al. | 173/48 |
| 7,967,078 | B2 * | 6/2011 | Aoki | 173/201 |
| 8,196,674 | B2 * | 6/2012 | Ikuta et al. | 173/162.1 |
| 8,235,138 | B2 * | 8/2012 | Aoki | 173/162.1 |
| 2004/0074653 | A1 * | 4/2004 | Hashimoto et al. | 173/109 |
| 2006/0076154 | A1 * | 4/2006 | Aoki | 173/212 |
| 2006/0086513 | A1 * | 4/2006 | Hashimoto et al. | 173/48 |
| 2008/0029282 | A1 * | 2/2008 | Ikuta | 173/114 |
| 2008/0283264 | A1 * | 11/2008 | Ikuta et al. | 173/211 |

(Continued)

FOREIGN PATENT DOCUMENTS

DE 10 2006 029 363 A1 1/2008

(Continued)

OTHER PUBLICATIONS

European Search Report for European Patent Application No. 09 00 8781, issued Oct. 12, 2009.

(Continued)

*Primary Examiner* — Robert Long

(74) *Attorney, Agent, or Firm* — Oliff & Berridge, PLC

(57) ABSTRACT

It is an object of the invention to provide a power tool with a rational placement of a dynamic vibration reducer within a tool body. A representative hammer drill embodied as a power tool according to this invention has a dynamic vibration reducer 151 which is placed within an internal space 110 located to a motion converting section 113 side of a driving motor 111 within a body 103. An inner edge of the internal space is defined by an outer edge of the motion converting section 113, and an outer edge of the internal space is defined by an outer periphery of the driving motor 111.

5 Claims, 8 Drawing Sheets

U.S. PATENT DOCUMENTS

| | | | | |
|---|---|---|---|---|
| 2009/0223693 | A1 | 9/2009 | Aoki | |
| 2009/0266570 | A1 * | 10/2009 | Hashimoto et al. | 173/112 |
| 2010/0000751 | A1 * | 1/2010 | Aoki | 173/114 |
| 2010/0051304 | A1 * | 3/2010 | Aoki | 173/114 |
| 2010/0175903 | A1 * | 7/2010 | Ikuta et al. | 173/2 |
| 2011/0155405 | A1 * | 6/2011 | Aoki | 173/162.2 |
| 2012/0067605 | A1 * | 3/2012 | Furusawa et al. | 173/162.2 |

FOREIGN PATENT DOCUMENTS

| | | | |
|---|---|---|---|
| EP | 1 415 768 | A1 | 5/2004 |
| EP | 1 892 062 | A2 | 2/2008 |
| GB | 2 433 909 | A | 7/2007 |
| JP | A-2004-154903 | | 6/2004 |
| JP | A-2006-062044 | | 3/2006 |
| JP | A-2007-237301 | | 9/2007 |
| WO | WO 2005/105386 | A1 | 11/2005 |
| WO | WO 2007/105742 | A1 | 9/2007 |
| WO | WO 2008/000545 | A1 | 1/2008 |

OTHER PUBLICATIONS

Sep. 10, 2012 Office Action issued in Japanese Patent Application No. 2008-177156 (with translation).

* cited by examiner

POWER TOOL

BACKGROUND OF THE INVENTION

1. Field of the Invention

The present invention relates to a power tool having a dynamic vibration reducer.

2. Description of the Related Art

WO 2005-105386 A1 discloses an electric hammer having a dynamic vibration reducing section. The known electric hammer is provided with a dynamic vibration reducer for reducing vibration caused in the hammer in an axial direction of a hammer bit during hammering operation. The dynamic vibration reducer has a weight which can move linearly in the state in which the elastic biasing force of a coil spring is exerted on the weight, so that vibration of the hammer is reduced during hammering operation by the movement of the weight in the axial direction of the hammer bit.

In designing a power tool with the above-described dynamic vibration reducer, it is desired to provide a technique for easily installing the dynamic vibration reducer and avoiding increase of the size of the entire power tool by effectively utilizing a free space within the tool body.

SUMMARY OF THE INVENTION

Accordingly, it is an object of the invention to provide a power tool with a rational placement of a dynamic vibration reducer within a tool body.

In order to solve the above-described problem, a power tool according to the present invention linearly drives a tool bit so as to cause the tool bit to perform a predetermined operation on a workpiece and includes at least a tool body, a driving motor, a motor output shaft, a motion converting section, an air spring chamber, a striking element, an internal space and a dynamic vibration reducer.

The driving motor is housed within the tool body. The motor output shaft of the driving motor extends in an axial direction of the tool bit.

The motion converting section includes a swinging member and a driving element and is disposed to the tool bit side of the driving motor in the axial direction of the tool bit. The swinging member is caused to swing in the axial direction of the tool bit by rotation of the motor output shaft. The driving element is disposed parallel to the motor output shaft and moves linearly in the axial direction of the tool bit via components of the swinging movement of the swinging member in the axial direction of the tool bit. The air spring chamber is defined within the driving element. The striking element strikes the tool bit via the air spring chamber or by the action of an air spring as a result of the linear movement of the driving element.

The internal space is located to the motion converting section side of the driving motor within the body. An inner edge of the internal space is defined by an outer edge of the motion converting section, and an outer edge of the internal space is defined by an outer periphery of the driving motor.

The dynamic vibration reducer includes a weight and an elastic member that elastically supports the weight with respect to the tool body. The weight elastically supported by the elastic member moves linearly in the axial direction of the tool bit against a spring force of the elastic member, so that vibration of the tool body is reduced during operation. The "linear movement of the weight" in this invention is not limited to linear movement in the axial direction of the tool bit, but it is only essential that the linear movement has at least components in the axial direction of the tool bit. Further, the dynamic vibration reducer is disposed within the above-described internal space.

Here, the internal space is located to the motion converting section side of the driving motor within the body. A space around the motion converting section is likely to be rendered free, so that the inner edge of the internal space can be defined by the outer edge of the motion converting section. Further, if the tool body itself is designed to fit on the outer periphery of the motor, the outer edge of the internal space can be defined by the outer periphery of the motor. Therefore, by installing the dynamic vibration reducer within the internal space, rational placement of the dynamic vibration reducer can be realized without increasing the size of the tool body by effectively utilizing a free space within the tool body. Further, the "placement of the dynamic vibration reducer within the internal space" may include the manner in which the dynamic vibration reducer is disposed within the internal space in its entirety or in part.

According to a preferred embodiment of the power tool in this invention, the dynamic vibration reducer is placed within the internal space in a position displaced from a line connecting the swinging member and the driving element when viewed in a section of the tool body which is taken in a direction transverse to the axial direction of the tool bit. With this construction, within the internal space, particularly effective space displaced from a line connecting the swinging member and the driving element can be utilized to place the dynamic vibration reducer.

According to a further embodiment of the power tool in this invention, the elastic member is configured as a coil spring that elastically supports the weight. Further, the weight has a spring receiving part that extends in a form of a hollow in the axial direction of the tool bit in at least one of front and rear portions of the weight and receives one end of the coil spring. With this construction, the length of the dynamic vibration reducer in the axial direction of the tool bit with the coil spring received and set in the spring receiving space of the weight can be reduced, so that the size of the dynamic vibration reducer can be reduced in the axial direction of the tool bit.

A power tool according to another embodiment of the present invention linearly drives a tool bit so as to cause the tool bit to perform a predetermined operation on a workpiece and includes at least a tool body, a driving motor, a motor output shaft, a motion converting section, an air spring chamber, a striking element, a power transmitting section, an internal space and a dynamic vibration reducer.

The tool body, the driving motor, the motor output shaft, the motion converting section, the air spring chamber, the striking element and the dynamic vibration reducer in this power tool have the same construction as the above-described tool body, driving motor, motor output shaft, motion converting section, air spring chamber, striking element and dynamic vibration reducer.

The power transmitting section includes a holding element and a transmission gear. The holding element extends in the axial direction of the tool bit and holds the tool bit. The transmission gear rotates the holding element on its axis and thus rotationally drives the tool bit when the motor output shaft rotates.

The internal space is located to the motion converting section side of the driving motor within the body. An inner edge of the internal space is defined by an outer edge of the motion converting section or an outer periphery of the driving motor, and an outer edge of the internal space is defined by an outer periphery of the transmission gear. The dynamic vibration reducer is disposed within this internal space.

Here, the internal space is located to the motion converting section side of the driving motor within the body. A space around the motion converting section is likely to be rendered free, so that the inner edge of the internal space can be defined by the outer edge of the motion converting section or the outer periphery of the driving motor. Further, if the upper portion of the tool body is designed to fit on the outer periphery of the transmission gear, the outer edge of the internal space can be defined by the outer periphery of the transmission gear. Therefore, by installing the dynamic vibration reducer within the internal space, rational placement of the dynamic vibration reducer can be realized without increasing the size of the tool body by effectively utilizing a free space within the tool body.

According to a further embodiment of the power tool in this invention, the dynamic vibration reducer is placed within the internal space in a position displaced to a tool upper region from the driving element when viewed in a section of the tool body which is taken in a direction transverse to the axial direction of the tool bit. With this construction, within the internal space, particularly effective space displaced to the tool upper region from the driving element can be utilized to place the dynamic vibration reducer. Other objects, features and advantages of the present invention will be readily understood after reading the following detailed description together with the accompanying drawings and the claims.

DETAILED DESCRIPTION OF THE INVENTION

Each of the additional features and method steps disclosed above and below may be utilized separately or in conjunction with other features and method steps to provide and manufacture improved power tools and method for using such power tools and devices utilized therein. Representative examples of the present invention, which examples utilized many of these additional features and method steps in conjunction, will now be described in detail with reference to the drawings. This detailed description is merely intended to teach a person skilled in the art further details for practicing preferred aspects of the present teachings and is not intended to limit the scope of the invention. Only the claims define the scope of the claimed invention. Therefore, combinations of features and steps disclosed within the following detailed description may not be necessary to practice the invention in the broadest sense, and are instead taught merely to particularly describe some representative examples of the invention, which detailed description will now be given with reference to the accompanying drawings.

A representative embodiment of the "power tool" according to the present invention is now described with reference to the drawings. In this embodiment, an electric hammer drill is explained as a representative example of the power tool.

First Embodiment

Figure 1:
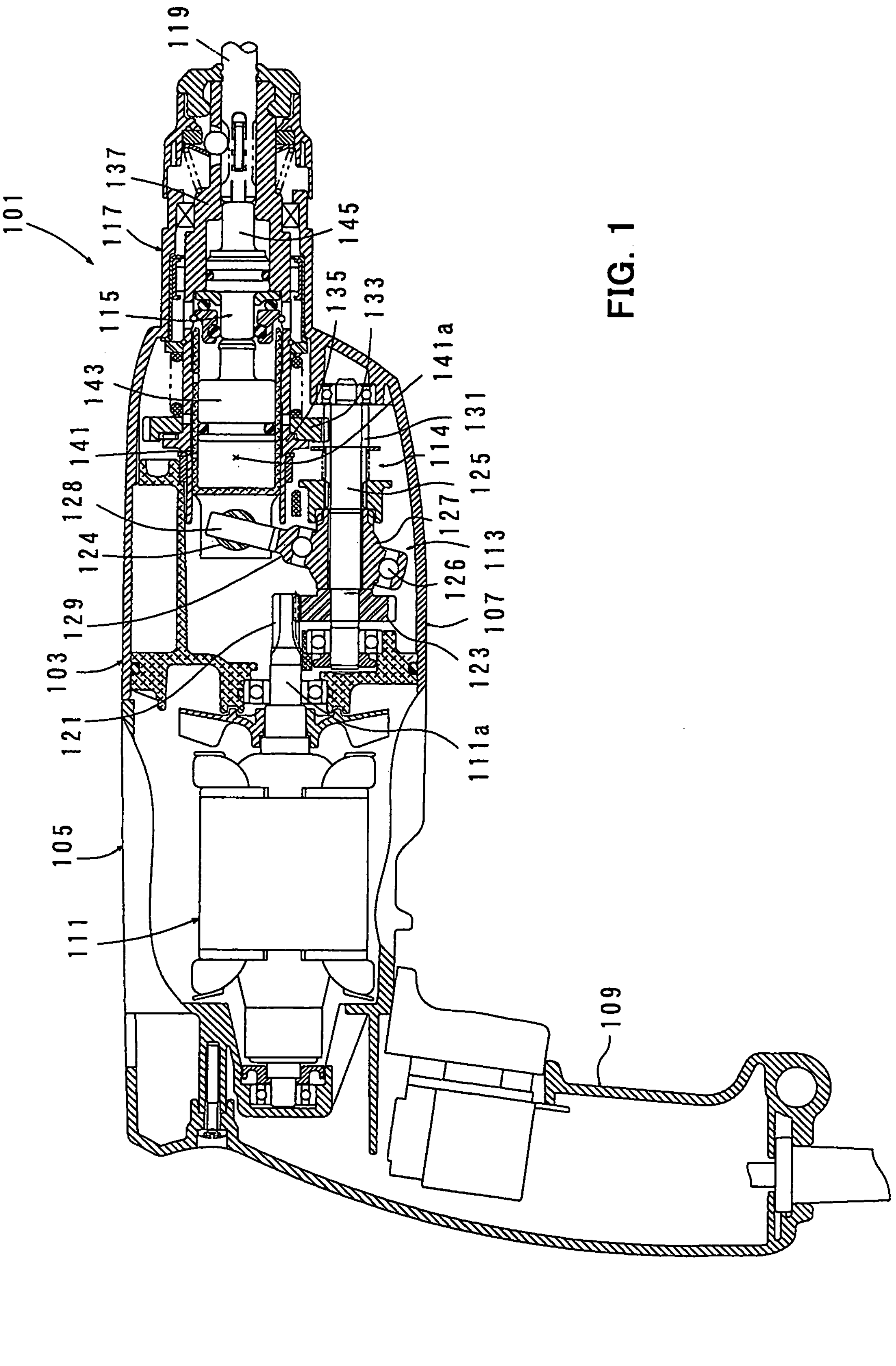
FIG. 1 is a sectional side view showing an entire structure of a hammer drill 101 according to a first embodiment.
Figure 2:
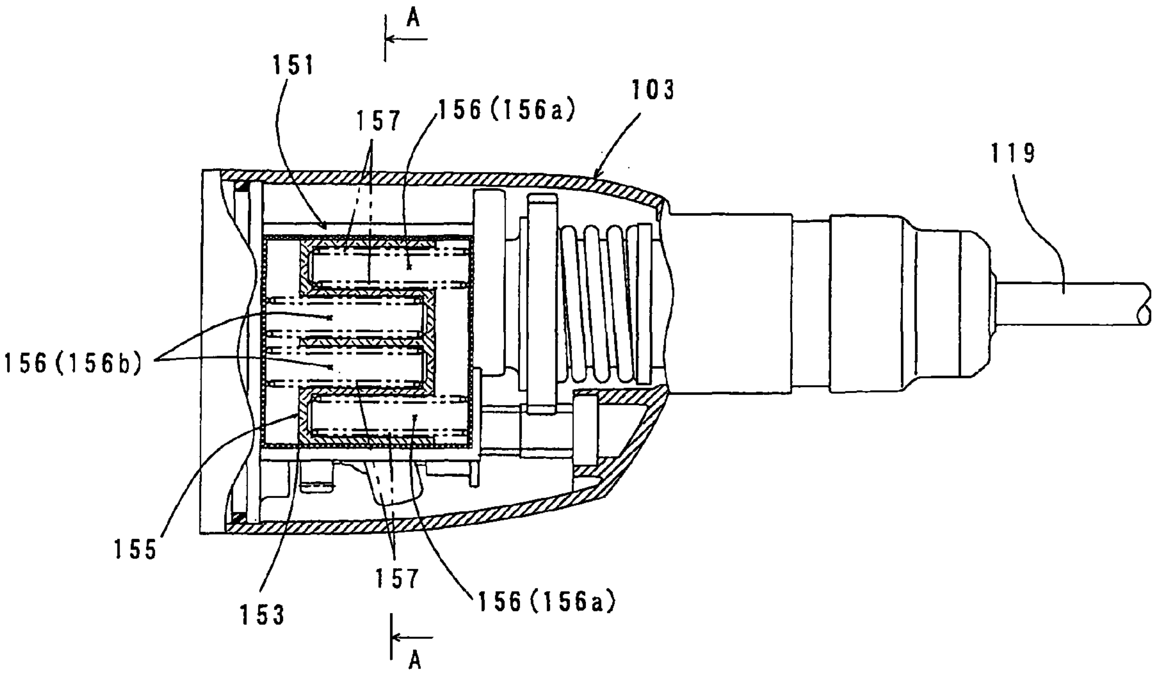
FIG. 2 is part of a sectional side view of a different section of the hammer drill 101 shown in FIG. 1.
Figure 3:
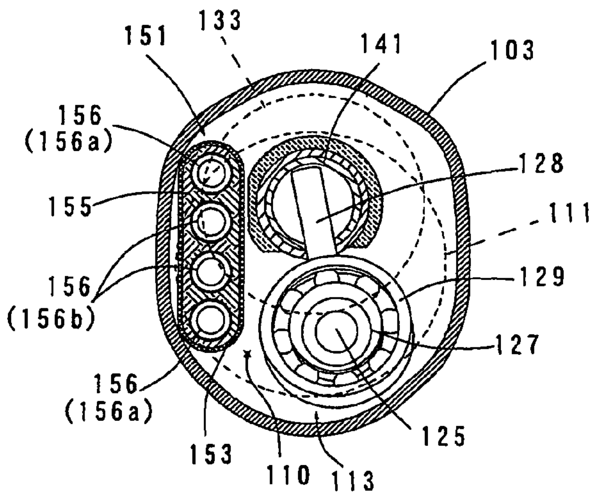
FIG. 3 is a sectional view of the hammer drill 101 taken along line A-A in FIG. 2.

A first embodiment of the power tool according to the present invention is now described with reference to FIGS. 1 to 3. FIG. 1 is a sectional side view showing an entire structure of a hammer drill 101 according to the first embodiment. FIG. 2 is part of a sectional side view of a different section of the hammer drill 101 shown in FIG. 1. FIG. 3 is a sectional view of the hammer drill 101 taken along line A-A in FIG. 2.

As shown in FIG. 1, the hammer drill 101 of the first embodiment mainly includes a body 103 that forms an outer shell of the hammer drill 101, a tool holder 137 connected to one end (right end as viewed in FIG. 1) of the body 103 in the longitudinal direction of the hammer drill 101, and a hammer bit 119 detachably coupled to the tool holder 137. The hammer bit 119 is held by the tool holder 137 such that it is allowed to reciprocate with respect to the tool holder in its axial direction (in the longitudinal direction of the body 103) and prevented from rotating with respect to the tool holder in its circumferential direction. The body 103 and the hammer bit 119 are features that correspond to the "tool body" and the "tool bit", respectively, according to the present invention.

The body 103 includes a motor housing 105 that houses a driving motor 111, a gear housing 107 that houses a motion converting section 113 and a power transmitting section 114, a barrel part 117 that houses a striking mechanism 115, and a handgrip 109 designed to be held by a user and connected to the other end (left end as viewed in FIG. 1) of the body 103 in the longitudinal direction of the hammer drill 101. In the present embodiment, for the sake of convenience of explanation, the side of the hammer bit 119 is taken as the front or tool front side and the side of the handgrip 109 as the rear or tool rear side.

The motion converting section 113 serves to appropriately convert the rotating output of the driving motor 111 into linear motion and then transmit it to the striking mechanism 115. Then, a striking force (impact force) is generated in the axial direction of the hammer bit 119 via the striking mechanism 115. The power converting section 113 is a feature that corresponds to the "power converting section" according to this invention. The power converting section 113 mainly includes a driving gear 121, a driven gear 123, a rotating element 127, a swinging ring 129 and a cylinder 141.

The driving gear 121 is connected to a motor output shaft 111*a* of the driving motor 111 that extends in the axial direction of the hammer bit 119, and rotationally driven when the driving motor 111 is driven. The driven gear 123 engages with the driving gear 121 and a driven shaft 125 is mounted to the driven gear 123. Therefore, the driven shaft 125 is connected to the motor output shaft 111*a* of the driving motor 111 and rotationally driven. The driving motor 111 and the motor output shaft 111*a* are features that correspond to the "driving motor" and the "motor output shaft", respectively, according to this invention.

The rotating element 127 rotates together with the driven gear 123 via the driven shaft 125. The outer periphery of the rotating element 127 fitted onto the driven shaft 125 is inclined at a predetermined inclination with respect to the axis of the driven shaft 125. The swinging ring 129 is rotatably mounted on the inclined outer periphery of the rotating element 127 via a bearing 126 and caused to swing in the axial direction of the hammer bit 119 by rotation of the rotating element 127. The swinging ring 129 is a feature that corresponds to the "swinging member" according to this invention. Further, the swinging ring 129 has a swinging rod 128 extending upward (in the radial direction) therefrom, and the swinging rod 128 is loosely engaged with an engagement member 124 formed on a rear end of the cylinder 141.

The cylinder 141 is caused to reciprocate by swinging movement of the swinging ring 129 and serves as a driving element for driving the striking mechanism 115. An air spring chamber 141*a* is defined within the cylinder 141. The cylinder 141 and the air spring chamber 141*a* are features that correspond to the "driving element" and the "air spring chamber", respectively, according to this invention. In this embodiment, the motor output shaft 111*a* of the driving motor 111, the driven shaft 125 and the driving element in the form of the cylinder 141 are arranged parallel to each other in the axial direction of the hammer bit 119. Further, in this embodiment, the driven shaft 125 is disposed below the motor output shaft 111*a* of the driving motor 111, and the cylinder 141 is disposed above the driven shaft 125.

The power transmitting section 114 serves to appropriately reduce the speed of the rotating output of the driving motor 111 and rotate the hammer bit 119 in its circumferential direction. The power transmitting section 114 is disposed to the hammer bit 119 side of the driving motor 111 in the axial direction of the hammer bit 119. The power transmitting section 114 is a feature that corresponds to the "power transmitting section" according to this invention. The power transmitting section 114 mainly includes a first transmission gear 131, a second transmission gear 133 and the tool holder 137.

The first transmission gear 131 is caused to rotate in a vertical plane by the driving motor 111 via the driving gear 121 and the driven shaft 125. The second transmission gear 133 is engaged with the first transmission gear 131 and rotates the tool holder 137 on its axis when the driven shaft 125 rotates. The tool holder 137 extends in the axial direction of the hammer bit 119 and serves as a holding element to hold the hammer bit 119, and it is rotated together with the second transmission gear 133. The second transmission gear 133 and the tool holder 137 are features that correspond to the "transmission gear" and the "holding element", respectively, according to this invention.

The striking element 115 mainly includes a striker 143 slidably disposed within the bore of the cylinder 141, and an intermediate element in the form of an impact bolt 145 that is slidably disposed within the tool holder 137 and serves to transmit the kinetic energy of the striker 143 to the hammer bit 119. The striker 143 is formed as a striking element to strike the hammer bit 119 via the air spring chamber 141*a* by the linear movement of the cylinder 141. The striker 143 is a feature that corresponds to the "striking element" according to this invention.

In the hammer drill 101 thus constructed, when the driving motor 111 is driven, the driving gear 121 is caused to rotate in a vertical plane by the rotating output of the driving motor. Then the rotating element 127 is caused to rotate in a vertical plane via the driven gear 123 engaged with the driving gear 121 and the driven shaft 125, which in turn causes the swinging ring 129 and the swinging rod 128 to swing in the axial direction of the hammer bit 119. Then the cylinder 141 is caused to linearly slide by the swinging movement of the swinging rod 128. By the action of the air spring function within the air spring chamber 141*a* as a result of this sliding movement of the cylinder 141, the striker 143 linearly moves within the cylinder 141 at a speed faster than that of the linear movement of the cylinder 141. At this time, the striker 143 collides with the impact bolt 145 and transmits the kinetic energy caused by the collision to the hammer bit 119. When the first transmission gear 131 is caused to rotate together with the driven shaft 125, the sleeve 135 is caused to rotate in a vertical plane via the second transmission gear 133 that is engaged with the first transmission gear 131, which in turn causes the tool holder 137 and the hammer bit 119 held by the tool holder 137 to rotate in the circumferential direction together with the sleeve 135. Thus, the hammer bit 119 performs a hammering movement in the axial direction and a drilling movement in the circumferential direction, so that the hammer drill operation is performed on the workpiece.

In the hammer drill 101 of this embodiment, a dynamic vibration reducer 151 is provided to reduce impulsive and cyclic vibration caused in the body 103 when the hammer bit 119 is driven as described above. As shown in FIGS. 2 and 3, the dynamic vibration reducer 151 mainly includes a dynamic vibration reducer body 153, a weight 155 for vibration reduction, and coil springs 157 disposed on the tool front and rear sides of the weight 155 and extending in the axial direction of the hammer bit 119. The dynamic vibration reducer 151 is a feature that corresponds to the "dynamic vibration reducer" according to this embodiment.

The dynamic vibration reducer body 153 has a housing space for housing the weight 155 and the coil springs 157 and is provided as a cylindrical guide for guiding the weight 155 to slide with stability. The dynamic vibration reducer body 153 is fixedly mounted to the body 103.

The weight 155 is formed as a mass part which is slidably disposed within the housing space of the dynamic vibration reducer body 153 in such a manner as to move in the longitudinal direction of the housing space (in the axial direction of the hammer bit 119). The weight 155 is a feature that corresponds to the "weight" according to this embodiment. The weight 155 has spring receiving spaces 156 having a circular section and extending in the form of a hollow in the axial direction of the hammer bit 119 over a predetermined region in the front and rear portions of the weight 155. One end of each of the coil springs 157 is received in the associated spring receiving space 156. The spring receiving space 156 is a feature that corresponds to the "spring receiving part" according to this embodiment. In this embodiment, as shown in FIGS. 2 and 3, four spring receiving spaces 156 are arranged in a vertical direction transverse to the axial direction of the hammer bit 119. Two of the four spring receiving spaces 156 which are formed in the front portion of the weight 155 (right region of the weight 155 as viewed in FIG. 2) are referred to as first spring receiving spaces 156*a*, and the other two in the rear portion of the weight 155 (left region of the weight 155 as viewed in FIG. 2) are referred to as second spring receiving spaces 156*b*. The first spring receiving spaces 156*a* receive the coil springs 157 disposed on the front of the weight 155, and the second spring receiving spaces 156*b* receive the coil springs 157 disposed on the rear of the weight 155.

The coil springs 157 are formed as elastic elements which support the weight 155 with respect to the dynamic vibration reducer body 153 or the body 103 such that the coil springs 157 exert respective spring forces on the weight 155 toward each other when the weight 155 moves within the housing space of the dynamic vibration reducer body 153 in the longitudinal direction (in the axial direction of the hammer bit 119). Further, preferably, the coil springs 157 received in the first spring receiving spaces **156*a* and the coil springs 157 received in the second spring receiving spaces 156*b* have the same spring constant. The coil spring 157** is a feature that corresponds to the "elastic member" and the "coil spring" according to this embodiment.

At this time, as for each of the front coil springs 157 received in the first spring receiving spaces **156*a*, a spring front end 157*a* is fixed on a spring front end fixing part 158 in the form of a front wall of the dynamic vibration reducer body 153, and a spring rear end 157*b* is fixed on a spring rear end fixing part 159 in the form of a bottom (end) of the first spring receiving spaces 156*a*. As for each of the rear coil springs 157 received in the second spring receiving spaces 156*b*, a spring front end 157*a* is fixed on a spring front end fixing part 158 in the form of a bottom (end) of the second spring receiving spaces 156*b*, and a spring rear end 157*b* is fixed on a spring rear end fixing part 159 in the form of a rear wall of the dynamic vibration reducer body 153. Thus, the front and rear coil springs 157 exert respective elastic biasing forces on the weight 155 toward each other in the axial direction of the hammer bit 119. Specifically, the weight 155 can move in the axial direction of the hammer bit 119 in the state in which the elastic biasing forces of the front and rear coil springs 157 are exerted on the weight 155 toward each other in the axial direction of the hammer bit 119**.

The weight 155 and the coil springs 157 serve as vibration reducing elements in the dynamic vibration reducer 151 on the body 103 and cooperate to passively reduce vibration of the body 103 during operation of the hammer drill 101. Thus, the vibration of the body 103 in the hammer drill 101 can be alleviated or reduced during operation. Particularly in this dynamic vibration reducer 151, as described above, the spring receiving spaces 156 are formed inside the weight 155 and one end of each of the coil springs 157 is disposed within the spring receiving space 156. Therefore, the length of the dynamic vibration reducer 151 in the axial direction of the hammer bit 119 with the coil springs 157 received and set in the spring receiving spaces 156 of the weight 155 can be reduced, so that the size of the dynamic vibration reducer 151 can be reduced in the axial direction of the hammer bit 119.

Further, in this embodiment, as shown in FIG. 2, the first and second spring receiving spaces **156*a*, 156*b* of the spring receiving spaces 156 formed in the weight 155 are arranged to overlap each other. Accordingly, the coil springs 157 received within the first spring receiving spaces 156*a* and the coil springs 157 received within the second spring receiving spaces 156*a* are arranged to overlap each other in a direction transverse to the extending direction of the coil springs. With this construction, the length of the weight 155 in the longitudinal direction with the coil springs 157 set in the spring receiving spaces 156 (156*a*, 156*b*) can be further reduced. Therefore, this construction is effective in further reducing the size of the dynamic vibration reducer 151 in its longitudinal direction and in reducing its weight with a simpler structure. Thus, this construction is particularly effective when installation space for the dynamic vibration reducer 151 in the body 103 is limited in the longitudinal direction of the body 103. Further, the coil springs can be further upsized by the amount of the overlap between the coil springs 157 received within the first spring receiving spaces 156*a* and the coil springs 157 received within the second spring receiving spaces 156*a*, provided that the dynamic vibration reducer 151 having the same length in the longitudinal direction is used. In this case, the dynamic vibration reducer 151 can provide a higher vibration reducing effect by the upsized coil springs with stability. The above-mentioned effects of the dynamic vibration reducer 151 can also be obtained by dynamic vibration reducers 251, 351, 551 to 554**, which will be described below.

In designing the hammer drill 101 in which the dynamic vibration reducer 151 effective in reducing vibration is installed in the body 103, it is desired to provide a technique for installing the dynamic vibration reducer 151 without laboring and avoiding increase of the size of the body 103 and thus the size of the entire hammer drill 101 by effectively utilizing a free space within the body 103. Therefore, inventors have made keen examinations on rational placement of the dynamic vibration reducer 151 within the body 103. As a result of the examinations, an example of rational placement of the dynamic vibration reducer 151 is shown in FIG. 3.

In the placement shown in FIG. 3, the dynamic vibration reducer 151 is placed in a left region (on the left side as viewed in FIG. 3) within the body 103 when the body 103 is viewed from the tool front (from the right as viewed in FIG. 2). Specifically, as shown in FIG. 3, the dynamic vibration reducer 151 having the above-described construction is disposed in an internal space 110 to the motion converting section 113 side of the driving motor 111 within the body 103. The inner edge of the internal space 110 is defined by the outer edge (the outer periphery) of the motion converting section 113 and the outer edge of the internal space 110 is defined by the outer periphery (shown by broken line in FIG. 3) of the driving motor 111. In other words, the internal space 110 is provided to one side of the motion converting section 113 and defined as a region which overlaps an area sectioned by the outer periphery of the driving motor 111 in the axial direction of the hammer bit 119. The internal space 110 is a feature that corresponds to the "internal space" according to this embodiment. Further, the "placement of the dynamic vibration reducer 151 within the internal space" in this specification widely includes the manner in which the dynamic vibration reducer 151 is disposed within the internal space in its entirety or in part.

In a region inside the body 103, a region around the motion converting section 113 is likely to be rendered free, so that the inner edge of the internal space 110 can be defined by the outer edge of the motion converting section 113. Further, if the body 103 itself is designed to fit on the outer periphery of the motor 111, the outer edge of the internal space 110 can be defined by the outer periphery of the motor 111. Therefore, by installing the dynamic vibration reducer 151 within the internal space 110, rational placement of the dynamic vibration reducer 151 can be realized without increasing the size of the body 103 by effectively utilizing a free space within the body 103.

Particularly in this embodiment, the dynamic vibration reducer 151 is placed within the internal space 110 in a position displaced laterally to one side of a line connecting the swinging ring 129 and the driving element in the form of the cylinder 141 when viewed in a section of the body 103 which is taken along a direction transverse to the axial direction of the hammer bit 119. Therefore, within the internal space 110, particularly effective space for placement of the dynamic vibration reducer 151 can be utilized. This construction can be realized by appropriately changing the placement of component parts of the motion converting section 113 such that the internal space for the dynamic vibration reducer 151 can be ensured, for example, in a position displaced laterally to one side of a line connecting the swinging ring 129 and the cylinder 141.

Second Embodiment

Figure 4:
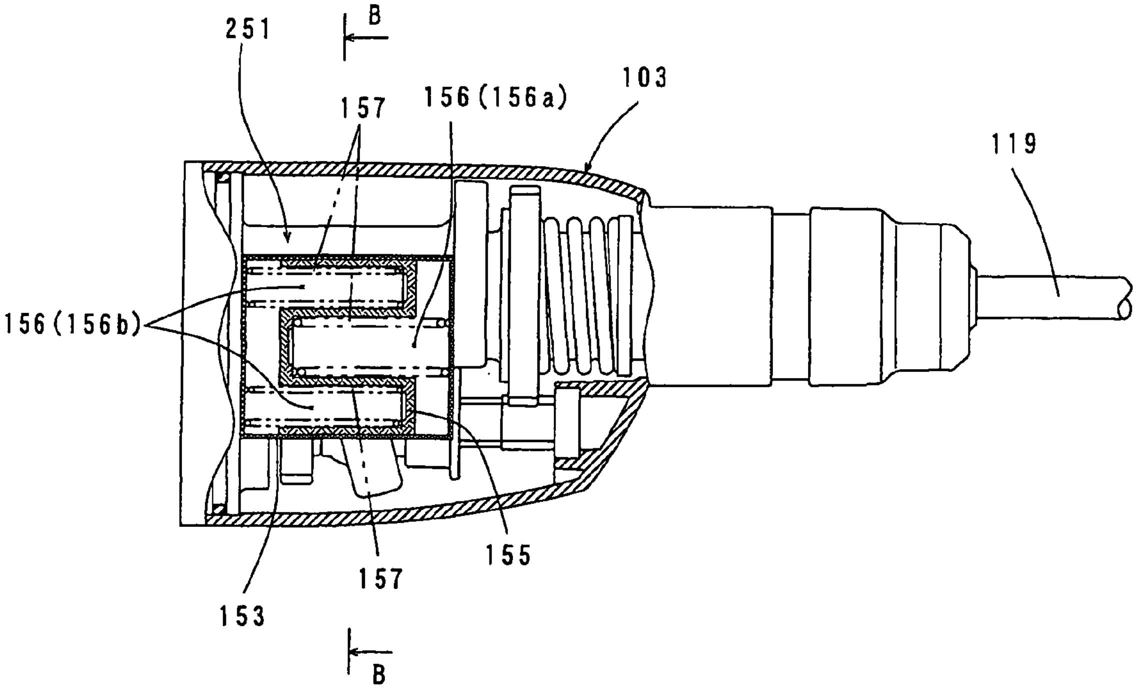
FIG. 4 is part of a sectional side view of the hammer drill 101 according a second embodiment.
Figure 5:
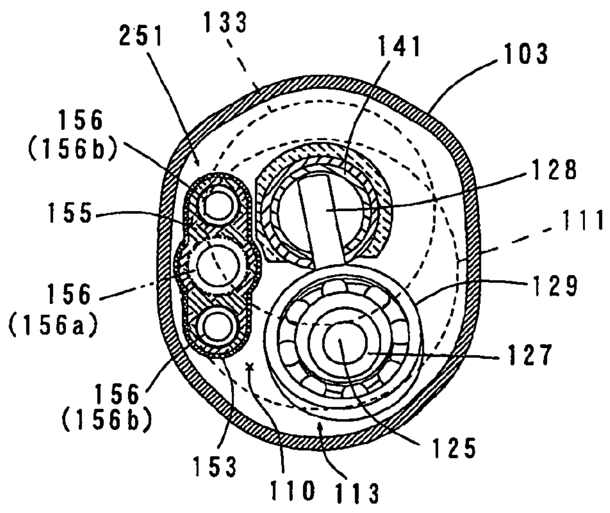
FIG. 5 is a sectional view of the hammer drill 101 taken along line B-B in FIG. 4.

A second embodiment of the power tool according to the present invention is now described with reference to FIGS. 4 and 5. The second embodiment is a modification to the construction of the dynamic vibration reducer 151 of the first embodiment, and in the other points, it has the same construction as the above-described first embodiment. FIG. 4 is part of a sectional side view of the hammer drill 101 according the second embodiment, and FIG. 5 is a sectional view of the hammer drill 101 taken along line B-B in FIG. 4. In FIGS. 4 and 5, components or elements which are substantially identical to those shown in FIGS. 1 to 3 are given like numerals.

As shown in FIGS. 4 and 5, a dynamic vibration reducer 251 according to the second embodiment is one embodiment of the "dynamic vibration reducer" according to this invention. The dynamic vibration reducer 251 is placed in a left region (on the left side as viewed in FIG. 5) within the body 103 when the body 103 is viewed from the tool front (from the right as viewed in FIG. 4). The dynamic vibration reducer 251 is placed particularly by utilizing the internal space 110 described above in the first embodiment. Specifically, as shown in FIG. 5, the dynamic vibration reducer 251 is placed within the body 103 particularly by utilizing the internal space 110 which is defined by the motion converting section 113 and the outer periphery (shown by broken line in FIG. 5) of the driving motor 111 in the axial direction of the hammer bit 119. In other words, the internal space 110 is provided to one side of the motion converting section 113 and defined as a region which overlaps an area sectioned by the outer periphery of the driving motor 111 in the axial direction of the hammer bit 119. Particularly in this embodiment, the dynamic vibration reducer 251 is placed within the internal space 110 in a position displaced laterally to one side of a line connecting the swinging ring 129 and the driving element in the form of the cylinder 141 when viewed in a section of the body 103 which is taken in a direction transverse to the axial direction of the hammer bit 119. Therefore, within the internal space 110, particularly effective space for placement of the dynamic vibration reducer 251 can be utilized.

In the dynamic vibration reducer 251, three spring receiving spaces 156 are arranged in a vertical direction transverse to the axial direction of the hammer bit 119. Two of the three spring receiving spaces 156 which are formed in the front portion of the weight 155 (a right region of the weight 155 as viewed in FIG. 4) are referred to as first spring receiving spaces 156*a*, and the other one in the rear portion of the weight 155 (a left region of the weight 155 as viewed in FIG. 4) are referred to as a second spring receiving space 156*b*. The first spring receiving spaces 156*a* receive the coil springs 157 disposed on the front of the weight 155, and the second spring receiving spaces 156*b* receive the coil spring 157 disposed on the rear of the weight 155. Thus, the front and rear coil springs 157 exert respective elastic biasing forces on the weight 155 toward each other in the axial direction of the hammer bit 119. The weight 155 can move in the axial direction of the hammer bit 119 in the state in which the elastic biasing forces of the front and rear coil springs 157 are exerted on the weight 155 toward each other in the axial direction of the hammer bit 119. Further, preferably, the sum of the spring constants of the two coil springs 157 received in the first spring receiving spaces 156*a* is equal to the spring constant of the coil spring 157 received in the second spring receiving space 156*b*.

Third Embodiment

Figure 6:
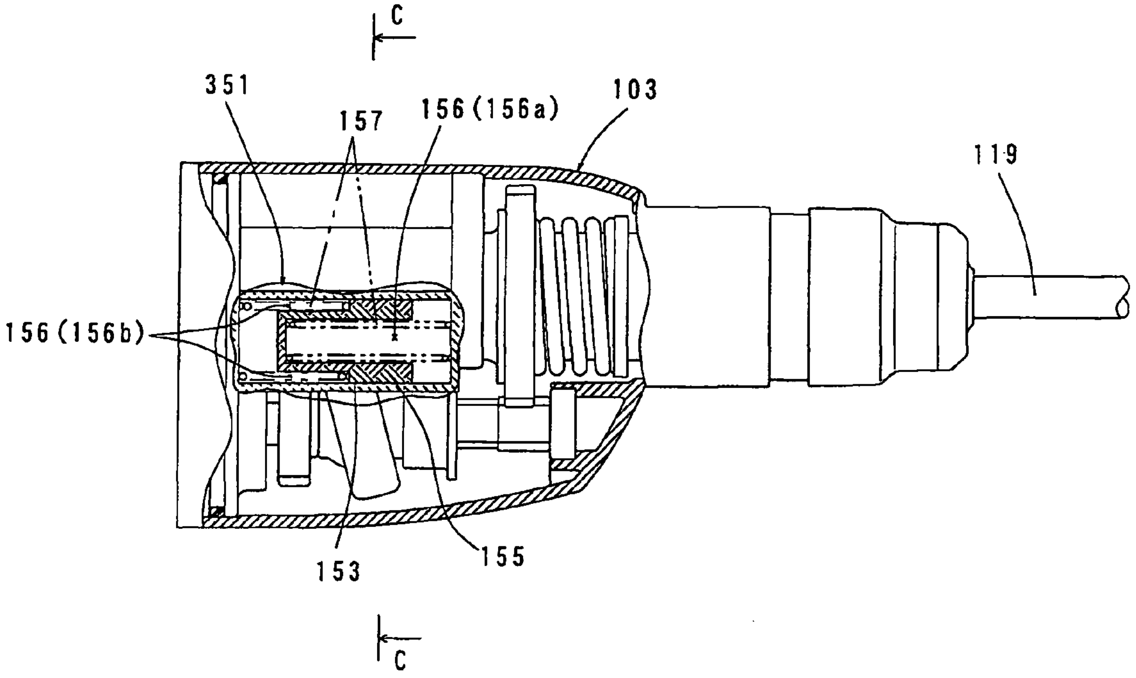
FIG. 6 is part of a sectional side view of the hammer drill 101 according a third embodiment.
Figure 7:
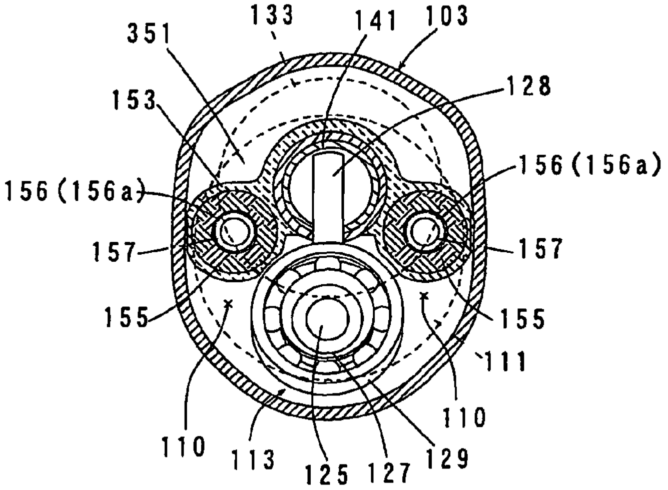
FIG. 7 is a sectional view of the hammer drill 101 taken along line C-C in FIG. 6.

A third embodiment of the power tool according to the present invention is now described with reference to FIGS. 6 and 7. The third embodiment is a modification to the construction of the dynamic vibration reducer 151 of the first embodiment, and in the other points, it has the same construction as the above-described first embodiment. FIG. 6 is part of a sectional side view of the hammer drill 101 according the third embodiment, and FIG. 7 is a sectional view of the hammer drill 101 taken along line C-C in FIG. 6. In FIGS. 6 and 7, components or elements which are substantially identical to those shown in FIGS. 1 to 3 are given like numerals.

As shown in FIGS. 6 and 7, a dynamic vibration reducer 351 according to the third embodiment is one embodiment of the "dynamic vibration reducer" according to this invention. The dynamic vibration reducer 351 is placed in right and left regions (on the right and left sides as viewed in FIG. 7) within the body 103. Two dynamic vibration reducers 351 are placed particularly by utilizing the internal space 110 described above in the first embodiment. The two dynamic vibration reducers 351 may also be considered as one integral dynamic vibration reducer 351. As shown in FIG. 7, the dynamic vibration reducers 351 are placed within the body 103 particularly by utilizing the internal space 110 which is defined by the motion converting section 113 and the outer periphery (shown by broken line in FIG. 7) of the driving motor 111 in the axial direction of the hammer bit 119. In other words, the internal space 110 is provided to the both sides of the motion converting section 113 and defined as a region which overlaps an area sectioned by the outer periphery of the driving motor 111 in the axial direction of the hammer bit 119. Particularly in this embodiment, the dynamic vibration reducers 351 are placed within the internal space 110 in a position displaced laterally to the both sides of a line connecting the swinging ring 129 and the driving element in the form of the cylinder 141 when viewed in a section of the body 103 which is taken in a direction transverse to the axial direction of the hammer bit 119. Therefore, within the internal space 110, particularly effective space for placement of the dynamic vibration reducers 351 can be utilized. Further, the two dynamic vibration reducers 351 are placed in a balanced manner on the right and left sides within the body 103.

In each of the dynamic vibration reducers 351, two spring receiving spaces 156 are arranged in a vertical direction transverse to the axial direction of the hammer bit 119. One of the two spring receiving spaces 156 which is formed in the front portion of the weight 155 (right region of the weight 155 as viewed in FIG. 6) is referred to as a first spring receiving space 156*a*, and the other one in the rear portion of the weight 155 (left region of the weight 155 as viewed in FIG. 6) is referred to as a second spring receiving space 156*b*. The first spring receiving space 156*a* receives the coil spring 157 disposed on the front of the weight 155, and the second spring receiving space 156*b* receives the coil spring 157 disposed on the rear of the weight 155. Thus, the front and rear coil springs 157 exert respective elastic biasing forces on the weight 155 toward each other in the axial direction of the hammer bit 119. The weight 155 can move in the axial direction of the hammer bit 119 in the state in which the elastic biasing forces of the front and rear coil springs 157 are exerted on the weight 155 toward each other in the axial direction of the hammer bit 119. Further, preferably, the coil spring 157 received in the first spring receiving space 156*a* and the coil spring 157 received in the second spring receiving space 156*b* have the same spring constant.

Fourth Embodiment

Figure 8:
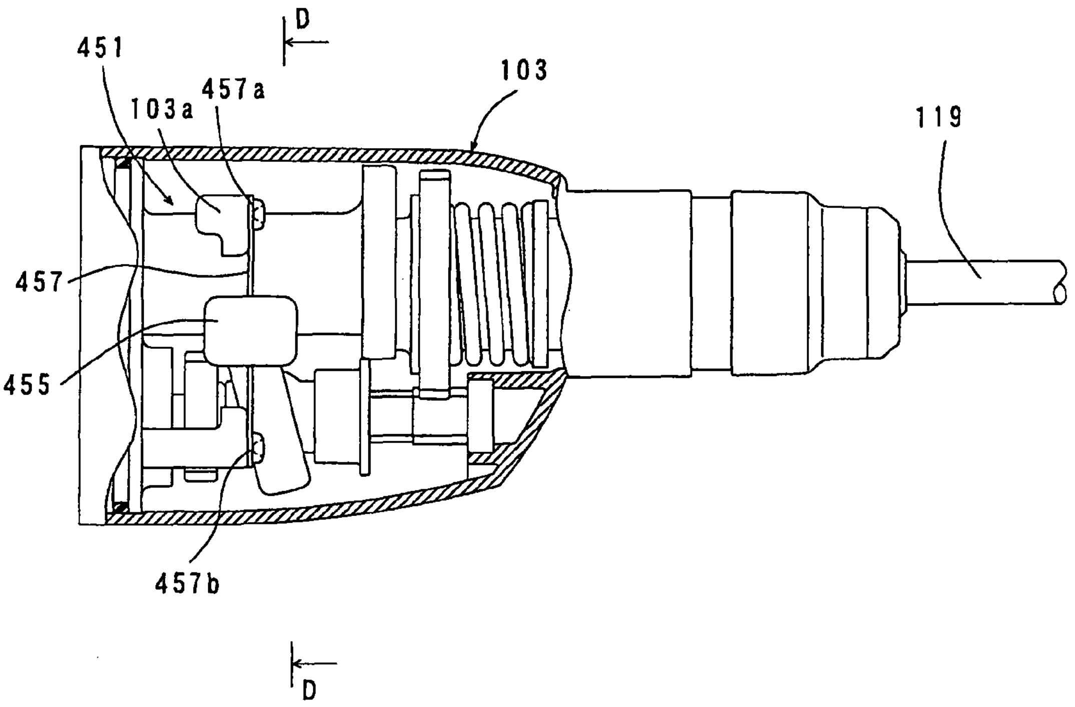
FIG. 8 is part of a sectional side view of the hammer drill 101 according a fourth embodiment.
Figure 9:
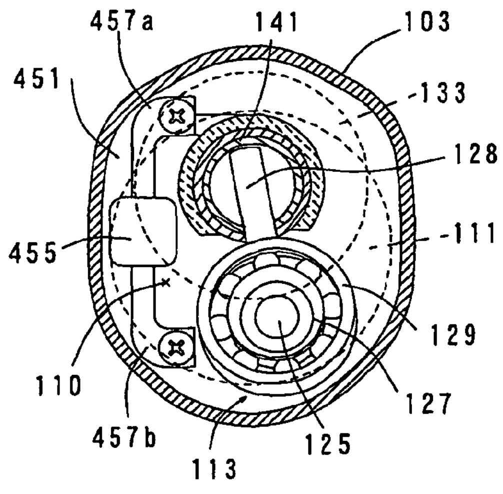
FIG. 9 is a sectional view of the hammer drill 101 taken along line D-D in FIG. 8.
Figure 10:
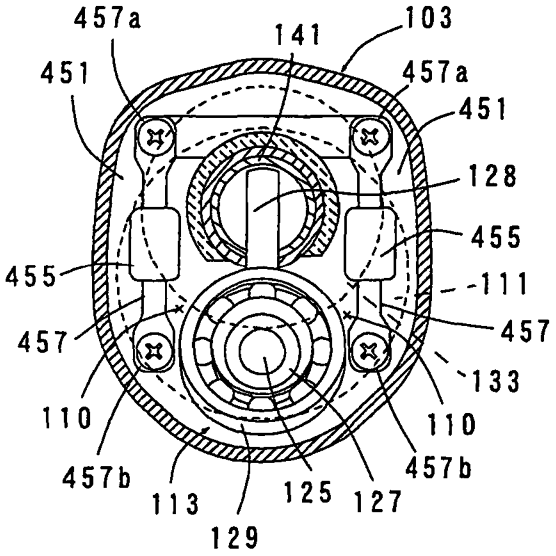
FIG. 10 shows a sectional structure similar to the structure shown in FIG. 9.

A fourth embodiment of the power tool according to the present invention is now described with reference to FIGS. 8 to 10. The fourth embodiment is a modification to the construction of the dynamic vibration reducer 151 of the first embodiment, and in the other points, it has the same construction as the above-described first embodiment. FIG. 8 is part of a sectional side view of the hammer drill 101 according the second embodiment, and FIG. 9 is a sectional view of the hammer drill 101 taken along line D-D in FIG. 8. FIG. 10 shows a sectional structure similar to the structure shown in FIG. 9. In FIGS. 8 to 10, components or elements which are substantially identical to those shown in FIGS. 1 to 3 are given like numerals.

As shown in FIGS. 8 and 9, a dynamic vibration reducer 451 according to the fourth embodiment is one embodiment of the "dynamic vibration reducer" according to this invention. The dynamic vibration reducer 451 is placed in a left region (on the left side as viewed in FIG. 8) within the body 103 when the body 103 is viewed from the tool front (from the right as viewed in FIG. 8). The dynamic vibration reducer 451 is placed particularly by utilizing the internal space 110 described above in the first embodiment. Specifically, as shown in FIG. 9, the dynamic vibration reducer 451 is placed within the body 103 particularly by utilizing the internal space 110 which is defined by the motion converting section 113 and the outer periphery (shown by broken line in FIG. 9) of the driving motor 111 in the axial direction of the hammer bit 119. In other words, the internal space 110 is provided to one side of the motion converting section 113 and defined as a region which overlaps an area sectioned by the outer periphery of the driving motor 111 in the axial direction of the hammer bit 119. Particularly in this embodiment, the dynamic vibration reducer 451 is placed within the internal space 110 in a position displaced laterally to one side of a line connecting the swinging ring 129 and the driving element in the form of the cylinder 141 when viewed in a section of the body 103 which is taken in a direction transverse to the axial direction of the hammer bit 119. Therefore, within the internal space 110, particularly effective space for placement of the dynamic vibration reducer 451 can be utilized.

The dynamic vibration reducer 451 mainly includes a weight 455 and a leaf spring 457. Spring end portions 457*a*, 457*b* on the both ends of the leaf spring 457 are mounted on a bracket 103*a* of the body 103 such that the leaf spring 457 is allowed to elastically deform in the axial direction of the hammer bit 119. The weight 455 is fixedly mounted on the middle of the leaf spring 457. The weight 455 can move in the axial direction of the hammer bit 119 in the state in which the elastic biasing force of the leaf spring 457 is exerted on the weight 455. Therefore, the weight 455 and the leaf spring 457 serve as vibration reducing elements in the dynamic vibration reducer 451 on the body 103 and cooperate to passively reduce vibration of the body 103 during operation of the hammer drill 101. Thus, the vibration of the body 103 in the hammer drill 101 can be alleviated or reduced during operation. The weight 455 and the leaf spring 457 of the dynamic vibration reducer 451 are features that correspond to the "weight" and the "leaf spring", respectively, according to this invention.

A plurality of dynamic vibration reducers identical or similar to the above-described dynamic vibration reducer 451 may be provided. In an example shown in FIG. 10, right and left internal spaces 110 in right and left regions (on the right and left sides as viewed in FIG. 10) within the body 103 are utilized to place the dynamic vibration reducers 451 therein. Specifically, as shown in FIG. 10, two dynamic vibration reducers 451 are placed within the body 103 by utilizing the internal space 110 which is defined by the motion converting section 113 and the outer periphery (shown by broken line in FIG. 10) of the driving motor 111 in the axial direction of the hammer bit 119. In other words, the internal spaces 110 are provided to the both sides of the motion converting section 113 and defined as a region which overlaps an area sectioned by the outer periphery of the driving motor 111 in the axial direction of the hammer bit 119. Particularly in this embodiment, the dynamic vibration reducers 451 are placed within the internal space 110 in a position displaced laterally to both sides of a line connecting the swinging ring 129 and the driving element in the form of the cylinder 141 when viewed in a section of the body 103 which is taken in a direction transverse to the axial direction of the hammer bit 119. Therefore, within the internal space 110, particularly effective space for placement of the dynamic vibration reducers 451 can be utilized. Further, the two dynamic vibration reducers 451 are placed in a balanced manner on the right and left sides within the body 103.

Fifth Embodiment

Figure 11:
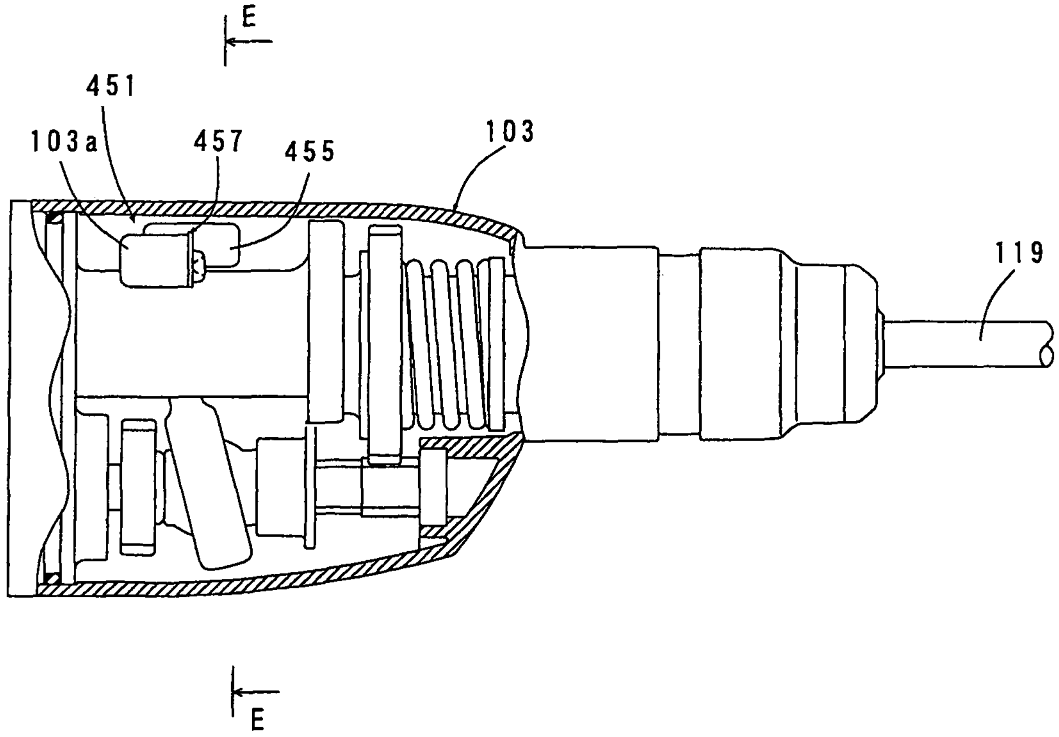
FIG. 11 is part of a sectional side view of the hammer drill 101 according a fifth embodiment.
Figure 12:
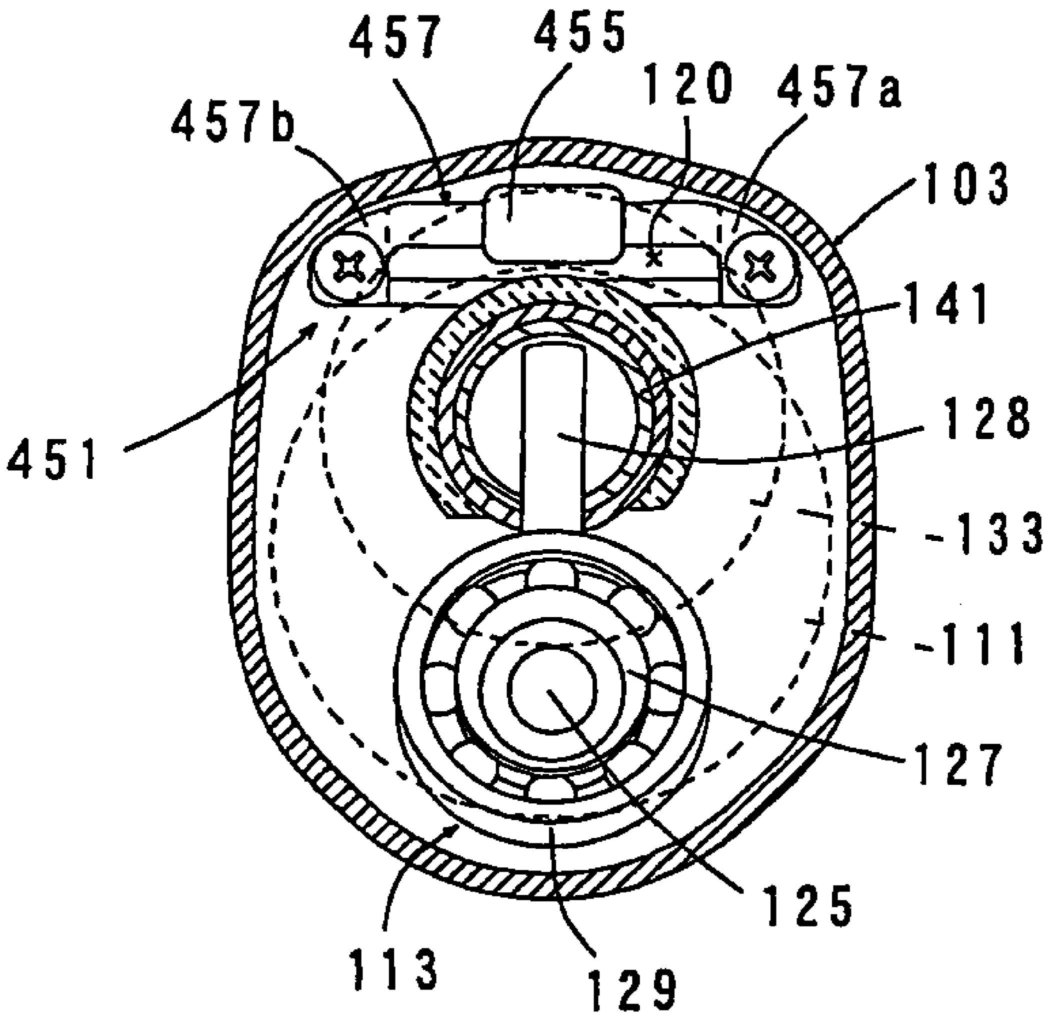
FIG. 12 is a sectional view of the hammer drill 101 taken along line E-E in FIG. 11.

A fifth embodiment of the power tool according to the present invention is now described with reference to FIGS. 11 and 12. The fifth embodiment is a modification to the placement of the dynamic vibration reducer 451 of the fourth embodiment, and in the other points, it has the same construction as the above-described fourth embodiment. FIG. 11 is part of a sectional side view of the hammer drill 101 according the fifth embodiment, and FIG. 12 is a sectional view of the hammer drill 101 taken along line E-E in FIG. 11. In FIGS. 11 and 12, components or elements which are substantially identical to those shown in FIGS. 8 and 9 are given like numerals.

As shown in FIGS. 11 and 12, in the fifth embodiment, the dynamic vibration reducer 451 is placed in a tool upper region (on the upper side as viewed in FIG. 12) within the body 103 and extends in the lateral direction of the body 103. The dynamic vibration reducer 451 is placed particularly by utilizing a second internal space 120 which is defined differently from the internal space 110 described above in the first embodiment. The dynamic vibration reducer 451 having the above-described construction is disposed in the second internal space 120. The second internal space 120 is a space located to the motion converting section 113 side of the driving motor 111 within the body 103. The inner edge of the internal space 120 is defined by the outer edge (outer periphery) of the motion converting section 113 or the outer periphery (shown by broken line in FIG. 12) of the driving motor 111, and the outer edge of the internal space 120 is defined by the outer periphery (shown by broken line in FIG. 12) of the second transmission gear 133. In other words, the internal space 120 is provided around the motion converting section 113 and defined as a region which overlaps an area sectioned by the outer periphery of the driving motor 111 or the outer periphery of the second transmission gear 133 in the axial direction of the hammer bit 119. The internal space 120 is a feature that corresponds to the "internal space" according to this embodiment.

In a region inside the body 103, a tool upper region above the motion converting section 113 is likely to be rendered free, so that the inner edge of the internal space 120 can be defined by the outer edge of the motion converting section 113 or the outer periphery of the second transmission gear 133. Further, if the upper portion of the body 103 is designed to fit on the outer periphery of the second transmission gear 133, the outer edge of the internal space 120 can be defined by the outer periphery of the second transmission gear 133. Therefore, by utilizing the internal space 120 to install the dynamic vibration reducer 451, rational placement of the dynamic vibration reducer 451 can be realized by effectively utilizing a free space within the body 103 without increasing the size of the body 103.

As shown in FIG. 12, particularly in this embodiment, the dynamic vibration reducer 451 is placed within the internal space 120 in a position displaced to the tool upper region (on the upper side as viewed in FIG. 12) from the driving element in the form of the cylinder 141 when viewed in a section of the body 103 which is taken in a direction transverse to the axial direction of the hammer bit 119. The "tool upper region" here is typically defined as a region on the side of cylinder 141 opposite to the swinging ring 129 when viewed in a section of the body 103 which is taken in a direction transverse to the axial direction of the hammer bit 119. Therefore, within the internal space 120, particularly effective space for placement of the dynamic vibration reducer 451 can be utilized. This construction can be realized by appropriately changing the placement of component parts of the motion converting section 113 such that the internal space for the dynamic vibration reducer 451 can be ensured, for example, in a position displaced to the tool upper region from the cylinder 141.

Figure 13:
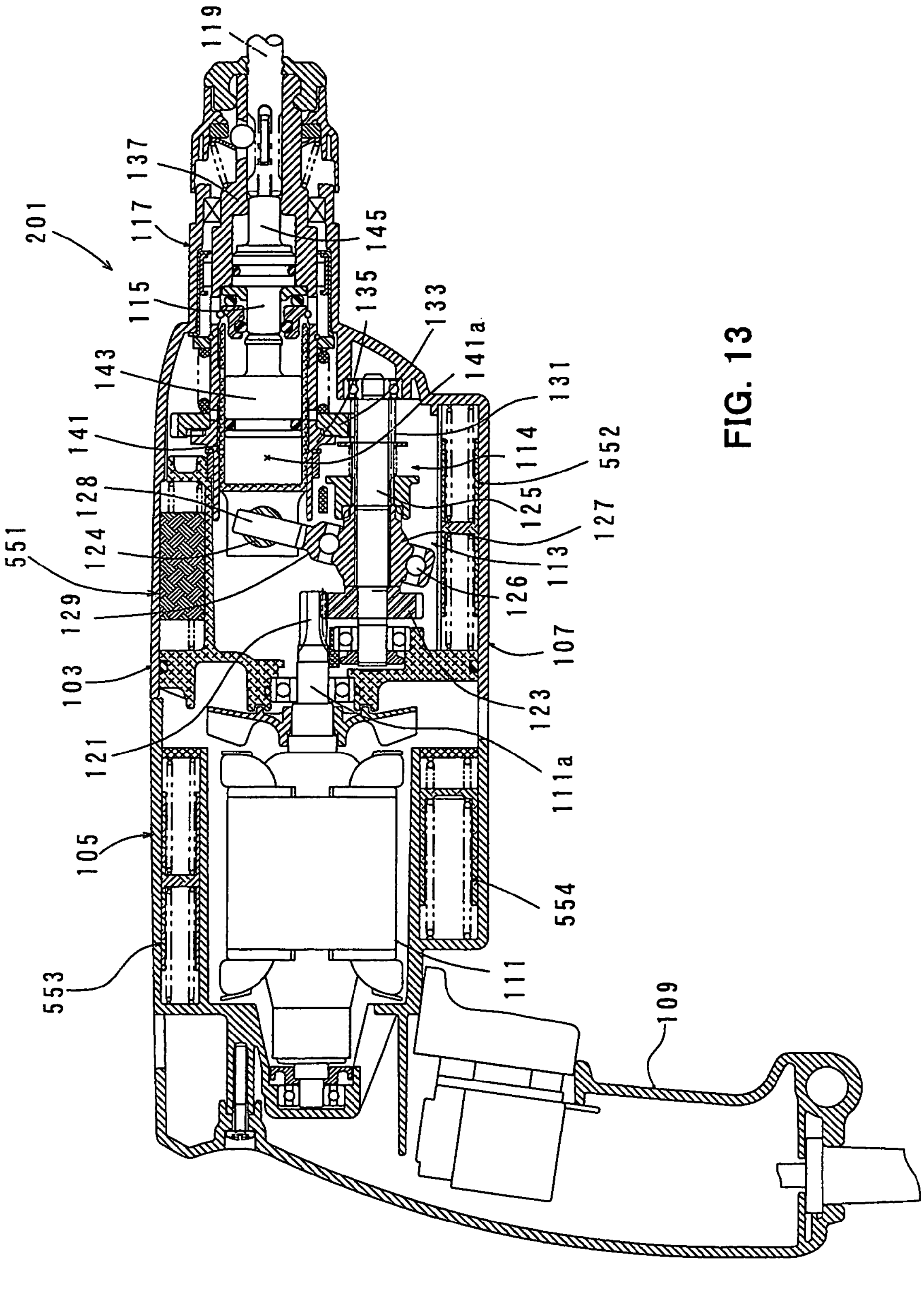
FIG. 13 is a sectional side view showing an entire structure of a hammer drill 201 according to another embodiment.

In the above embodiments, the dynamic vibration reducers 151, 251, 351, 451 are described as being installed in the internal space 110 or the internal space 120 within the body 103, but it may be constructed such that one or more of these dynamic vibration reducers are installed in an area other than the internal space 110 or 120 within the body 103, as necessary. Such a construction is shown in FIG. 13. FIG. 13 is a sectional side view showing an entire structure of a hammer drill 201 according to another embodiment. Components or elements of the hammer drill 201 which are substantially identical to those of the hammer drill 101 shown in FIG. 1 are given like numerals.

As shown in FIG. 13, in the hammer drill 201 which is one embodiment of the "power tool" according to this invention, dynamic vibration reducers 551, 552 are placed in the tool upper and lower regions (on the upper and lower sides as viewed in FIG. 13) to the both upper and lower sides of the motion converting section 113 and the power transmitting section 114 within the body 103. Further, in the hammer drill 201, dynamic vibration reducers 553, 554 are placed in the tool upper and lower regions (on the upper and lower sides as viewed in FIG. 13) to the both upper and lower sides of the driving motor 111 within the body 103. Like the above-described dynamic vibration reducers 151, 251, 351, the dynamic vibration reducers 551 to 554 are designed to passively reduce vibration by cooperation of the weight and the coil springs. Preferably, the dynamic vibration reducers 551 to 554 are placed in the center in the lateral direction of the housing such that the respective weights are aligned with the center of the driven shaft 125 when viewed in a section of the housing which is taken in a direction transverse to the axial direction of the hammer bit 119. In FIG. 13, for the sake of convenience, all of the dynamic vibration reducers 551 to 554 are shown provided within the body 103, but it is essential to provide at least one of the dynamic vibration reducers 551 to 554 within the body 103. One or more of the dynamic vibration reducers 551 to 554 can be provided within the body 103, as necessary.

In a power tool such as the hammer drill 201, a housing upper portion may get in the way of performing an operation if it is bulged upward (to the upper side as viewed in FIG. 13). Accordingly, it is desired to design the housing upper portion to be bulged upward to the smallest possible extent. Therefore, after designing the housing upper portion to be bulged upward to the smallest possible extent, particularly, the dynamic vibration reducers 551 and 553 which are placed in the upper space within the body 103 are preferably arranged in a curved form along the housing wall surface, when viewed in a section of the housing which is taken in a direction transverse to the axial direction of the hammer bit 119. On the other hand, the housing lower portion is allowed to be bulged downward (to the lower side as viewed in FIG. 13) to such an extent as not to get in the way of operation. Thus, the dynamic vibration reducers 552 and 554 which are placed in the lower space within the body 103 have a greater freedom of placement compared with the dynamic vibration reducers 551 and 553.

In the above-described dynamic vibration reducers 151, 251, 351, the front and rear portions of the weight are recessed to form the spring receiving spaces for receiving one end of the coil spring. In this invention, however, it may be constructed, without providing the spring receiving spaces in the weight, such that one end of each of the coil springs is fixed on the front or rear end of the weight. In this case, the spring receiving spaces or fixing areas of the coil springs may be provided on at least one of the front and rear ends of the weight, as necessary.

Further, in the above embodiments, the hammer drill is described as a representative example of the power tool, but the present invention can also be applied to a hammer which linearly drives a tool bit to perform a predetermined operation, or other various kinds of power tools.

DESCRIPTION OF NUMERALS

101, 201 hammer drill (power tool)
103 body (tool body)
103*a* bracket
105 motor housing
107 gear housing
109 handgrip
110 internal space
111 driving motor
111*a* motor output shaft
113 motion converting section
115 striking mechanism
117 power transmitting section
119 hammer bit (tool bit)
120 internal space
121 driving gear
123 driven gear
124 engagement member
125 driven shaft
126 bearing
127 rotating element
128 swinging rod
129 swinging ring
131 first transmission gear
133 second transmission gear
135 sleeve
137 tool holder
141 cylinder

143 striker
145 impact bolt
151, 251, 351, 451, 551, 552, 553, 554 dynamic vibration reducer
153 dynamic vibration reducer body
155 weight
156 spring receiving space (spring receiving part)
156*a* first spring receiving space
156*b* second spring receiving space
157 coil spring
157*a* spring front end
157*b* spring rear end
158 spring front end fixing part
159 spring rear end fixing part
455 weight
457 leaf spring
457*a*, 457*b* spring end portion

What we claim is:

1. A power tool which linearly drives a tool bit to perform a predetermined operation on a workpiece comprising:

a tool body, a driving motor housed within the tool body, a motor output shaft of the driving motor which extends in an axial direction of the tool bit, a motion converting section, having a swinging member that swings in the axial direction of the tool bit by rotation of the motor output shaft, and a driving element that is disposed parallel to the motor output shaft and moves linearly in the axial direction of the tool bit via components of the swinging movement of the swinging member in the axial direction of the tool bit, wherein the motion converting section is disposed to the tool bit side of the driving motor in the axial direction of the tool bit, an air spring chamber defined within the driving element, a striking element that strikes the tool bit via the air spring chamber by linear movement of the driving element, an internal space which is located around the motion converting section within the body and extends in a co-axial direction of the tool body of the power tool, an inner edge of the internal space being defined by an outer edge of the motion converting section, and an outer edge of the internal space being defined by an outer periphery of the driving motor, when viewed from the co-axial direction of the tool body of the power tool, which is parallel to the axial direction of the tool bit, and a dynamic vibration reducer having a weight and an elastic member that elastically supports the weight with respect to the tool body, wherein the weight elastically supported by the elastic member moves linearly in the axial direction of the tool bit against a spring force of the elastic member to reduce the vibration of the tool body, and the dynamic vibration reducer is disposed within the internal space.

2. The power tool as defined in claim 1, wherein the dynamic vibration reducer is placed within the internal space in a position displaced between a line connecting the swinging member and the driving element and the striking element when viewed in a section of the tool body which is taken in a direction transverse to the axial direction of the tool bit.

3. The power tool as defined in claim 1, wherein the elastic member comprises a coil spring that elastically supports the weight, the weight has a spring receiving part, the spring receiving part extends in a form of a hollow in the axial direction of the tool bit in at least one of front and rear portions of the weight, and the spring receiving part receives one end of the coil spring.

4. A power tool which linearly drives a tool bit to perform a predetermined operation on a workpiece, comprising:

a tool body, a driving motor housed within the tool body, a motor output shaft of the driving motor which extends in an axial direction of the tool bit, a motion converting section, including a swinging member that is caused to swing in the axial direction of the tool bit by rotation of the motor output shaft, and a driving element that is disposed parallel to the motor output shaft and moves linearly in the axial direction of the tool bit via components of the swinging movement of the swinging member in the axial direction of the tool bit, the motion converting section being disposed to the tool bit side of the driving motor in the axial direction of the tool bit, an air spring chamber defined within the driving element, a striking element that strikes the tool bit via the air spring chamber by linear movement of the driving element, a power transmitting section, including a holding element that extends in the axial direction of the tool bit and holds the tool bit, and a transmission gear that rotates the holding element on its axis and thus rotationally drives the tool bit when the motor output shaft rotates, an internal space which is located around the motion converting section within the body and extends in a co-axial direction of the tool body of the power tool, an inner edge of the internal space being defined by an outer edge of the motion converting section or an outer periphery of the driving motor, and an outer edge of the internal space being defined by an outer periphery of the transmission gear, when viewed from the co-axial direction of the tool body of the power tool, which is parallel to the axial direction of the tool bit, and a dynamic vibration reducer having a weight and an elastic member that elastically supports the weight with respect to the tool body, wherein the weight elastically supported by the elastic member moves linearly in the axial direction of the tool bit against a spring force of the elastic member to reduce the vibration of the tool body, and the dynamic vibration reducer is disposed within the internal space.

5. The power tool as defined in claim 4, wherein the dynamic vibration reducer is placed within the internal space in a position displaced to a tool upper region from the driving element when viewed in a section of the tool body which is taken in a direction transverse to the axial direction of the tool bit.

* * * * *